Nov. 18, 1969   H. J. ZELIK   3,478,788
ATTACHING CONSTRUCTION FOR A PORTABLE TOOL EDGE GUIDE
Filed May 26, 1967
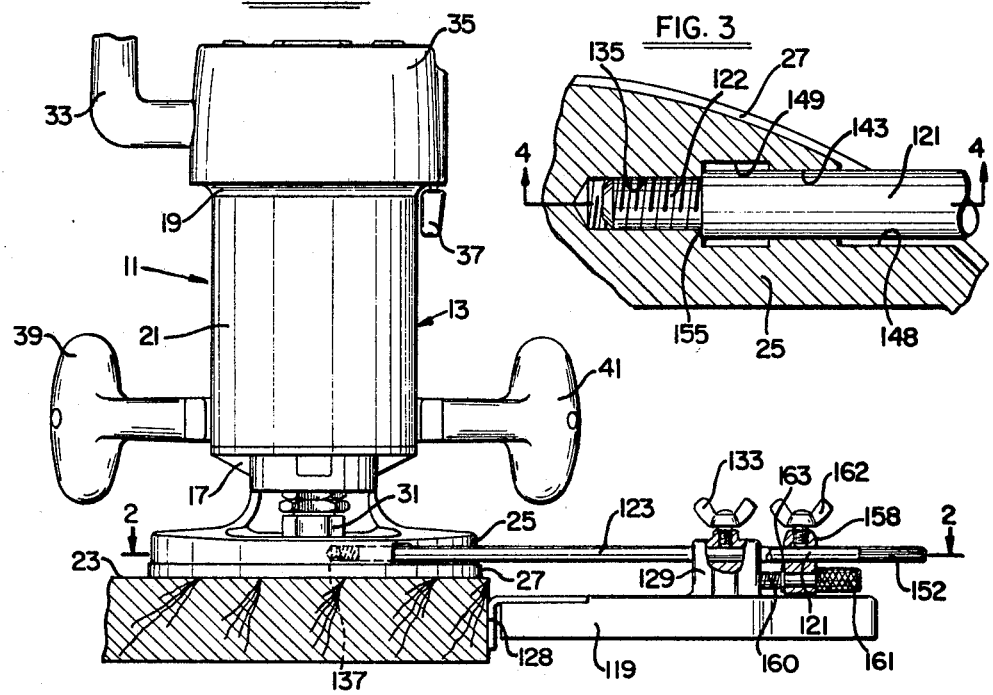
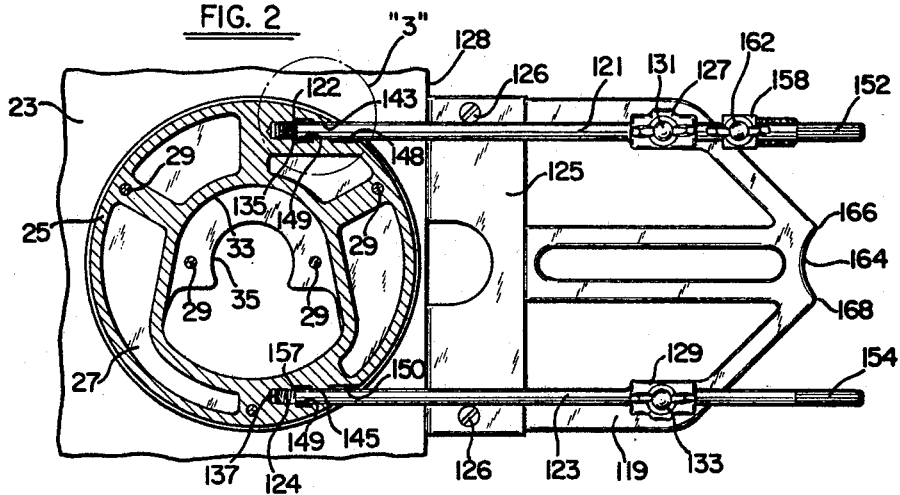
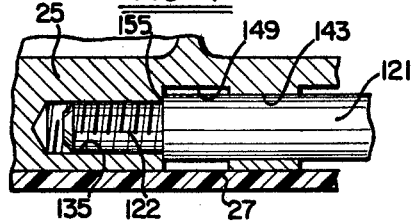
*INVENTOR*
HYNEK J. ZELIK
BY Joseph R. Slotnik
*ATTORNEY*

United States Patent Office 3,478,788
Patented Nov. 18, 1969

3,478,788
ATTACHING CONSTRUCTION FOR A PORTABLE TOOL EDGE GUIDE
Hynek J. Zelik, Baltimore, Md., assignor to The Black and Decker Manufacturing Company, Towson, Md., a corporation of Maryland
Filed May 26, 1967, Ser. No. 641,603
Int. Cl. B23c 1/20; B27c 5/04
U.S. Cl. 144—136                                6 Claims

ABSTRACT OF THE DISCLOSURE

The device disclosed herein is a portable router which includes an electric motor having a motor shaft coupled to a router bit by a collet. The motor is encased within a composite housing and the latter is supported upon and movable over a workpiece surface by a rigid base. An edge guide is adjustably secured to the base and is adapted to engage a workpiece edge to guide the path of router movement during use.

---

This invention relates generally to portable tools, and particularly to an improved attaching construction for portable tool edge guides.

SUMMARY OF THE INVENTION

The present invention relates to an improved construction for adjustably securing an edge guide to a tool base. More particularly, the invention includes a plurality of rods, each having one end threaded into the base which supports the tool for movement over a work surface. A router guide body slidably disposed upon the rods for movement toward and away from the base and is engageable with a workpiece edge to guide the path of movement of the tool over the workpiece. Means are provided to releasably secure the guide body to the rods which also prevents the rods from unthreading from the base. Furthermore, the base and the rods are constructed and arranged at the area of the threaded joint to reduce stress concentration on the rods at the threaded joint.

Main objects, therefore, of the present invention are to provide an improved construction for adjustably attaching a tool guide to a tool base which is firm and secure and resists loosening and which reduces stress concentration between parts.

Further objects of the present invention are to provide an improved attaching construction of the above character which facilitates rapid assembly and disassembly of the component parts together with accurate and easy guide adjustment.

Additional objects of the present invention are to provide an improved attaching construction of the above character which is relatively inexpensive to manufacture, rugged in construction and reliable in use.

Other objects and advantages of the present invention will become more apparent from a consideration of the detailed description to follow taken in conjunction with the appended drawings.

BRIEF DESCRIPTION OF THE DRAWINGS

FIG. 1 is an elevational view illustrating a router and edge guide therefor embodying the present invention;
FIG. 2 is a sectional view of FIG. 1 taken along the line 2—2 thereof;
FIG. 3 is an enlarged view of a portion of FIG. 2 taken within the enclosure 3 thereof; and
FIG. 4 is a sectional view of FIG. 3 taken along the line 4—4 thereof.

BROAD STATEMENT OF THE INVENTION

Broadly described, the present invention relates to a portable tool of the type having a housing, a drive motor supported by said housing and adapted to drive a tool implement, a base supporting said housing relative to a surface and movable thereover, and includes that improvement which comprises guide means engageable with an edge of said work surface to guide movement of said tool thereover, a pair of opening means formed in said base, each said opening means including an inner threaded portion and an outer guide portion separated by an enlarged cavity, a pair of elongated rods each having a reduced threaded end threaded into the threaded portion of a respective one of said opening means, a shouler formed on each of said rods adjacent its reduced end and adapted to abut a shoulder in a respective one of said opening means adjacent said inner threaded portion, said rods being disposed generally parallel to one another and being snugly but slidably received by the guide portion of respective ones of said opening means, said guide means being slidably disposed on said rods, and releasable means carried by said guide means and engageable with each said rod to secure said guide thereto and prevent said rods from unthreading relative to said base.

In another aspect, the present invention relates to a portable tool of the type having a housing, a drive motor supported by said housing and adapted to drive a tool implement, a base supporting said housing relative to a work surface and movable thereover; that improvement which comprises guide means engageable with an edge of said work surface to guide movement of said tool thereover, a pair of opening means formed in said base, each said opening means including an inner threaded portion and an outer guide portion separated by an enlarged cavity, said enlarged cavities extending to a bottom surface of said base and being covered by a sub base removably secured to said base, a pair of elongated rods each having a threaded end threaded into the threaded portion of a respective one of said opening means, said rods being disposed generally parallel to one another and being snugly but slidably received by the guide portion of respective ones of said opening means, said guide means being slidably disposed on said rods, and releasable means carried by said guide means and engageable with each said rod to secure said guide thereto and prevent said rods from unthreading relative to said base.

DETAILED DESCRIPTION

Referring now more particularly to the drawings, a router embodying the present invention is illustrated generally at 11 in FIG. 1. However, this tool is intended only to be illustrative of the general class of portable power operated tools including routers, reciprocating saws, circular saws, nibblers and shears, wherein accurate guiding of the tool over a work surface is important. With this in mind, the router 11 is seen to include a composite, generally cylindrical motor housing 13 having an electric motor (not shown) disposed therein. The housing 13 comprises interconnected front and rear housing members 17, 19 having a tubular housing sleeve 21 sandwiched therebetween. the housing 13 is supported relative to a work surface 23 by a base 25 having a sub base 27 secured thereto by screws 29. The base is adjustably secured to the motor housing sleeve 21 so that the housing 13 may be adjusted toward and away from the work surface 23. The motor (not shown) has a motor shaft (not shown) which rotatably drives a tool implement or bit (not shown) connected thereto by a collet device 31. The base 25 and sub base 27 have central apertures 33, 35, as shown in FIG. 2, to receive the collet device 31 so that the tool bit (not shown) has access to the work surface 23.

The electric motor (not shown) is powered from a suitable source through a line cord 33 trapped in place on the housing 13 by an end cap 35. An on-off switch (not shown) interconnects the line cord 33 and the motor and is controlled by a lever 37 so that when the line cord 33 is plugged in and the switch 37 moved to the "on" position, the router 11 is ready for use. A pair of handles 39, 41 are provided on the base 25 for control and manipulation of the router 11 over the work surface 23. For a detailed illustration and explanation of the router motor, motor housing 13 and interconnected base 25, reference may be made to applicant's copending application Ser. No. 640,-029, filed May 22, 1967 and owned by the assignee of the present application. However, since this structure forms no part of the present application, it is not illustrated nor described further here.

In use, the router 11 is positioned with the sub base 27 seated on the work surface 23 and the router is manually moved over the work surface by means of the pair of handles 39, 41. In many operations, it is desirable to employ a lateral guide with the router 11 which engages a work surface edge and helps control the path of movement of the router over the work surface 23. These guides necessarily are adjustable toward and away from the router tool bit to perform cuts at different distances from the work surface edge. Conventionally, these guides are slidably disposed on two or more guide rods which are fixed to the router base. The guide rods generally are secured in openings in the guide and in the base by the frictional force of set screws which thread into the base and abut endwise against the rods, clamp plates which frictionally hold the rods on the guide and on the base, or other similar friction type clamping means. One of the problems in this type of construction is that during use of the tool, vibration and other jarring forces are imposed on the guide and tend to loosen the set screws or the clamping plate which secures the rods to the guide and tool base. When this occurs, the guide can move relative to the tool bit and its accuracy is lost.

According to the present invention, guide means including a guide body 119 is adjustably secured relative to the router base 25 through a pair of spaced, parallel guide rods 121, 123. The guide body 119 has a straight side guide plate 125 secured along one side thereof by screws 126, which plate is adapted to engage a work surface edge 128 to guide the tool 11 during use. A pair of upstanding, apertured bosses 127, 129 are formed integral with or are otherwise suitably secured to the guide body 119 and slidably receive the rods 121, 123, respectively. Thumb screws 131, 133 are threaded into the bosses 127, 129 to endwise abut the rods 121, 123, respectively, and releasably secure the guide body 119 thereto.

The rods 121, 123 have reduced inner ends 122, 124 threaded into parallel threaded bores 135, 137, respectively, formed in the base 85. As shown in FIG. 3, a larger guide bore 143 is aligned with the threaded bore 135 but is spaced therefrom by an enlarged cavity 149 which may be cast into the base 25. Similarly, a guide bore 145 is aligned with the bore 137 but is spaced therefrom by a cavity 149. Notches 148, 150 in the base 25 help guide the threaded ends of the rods into the guide bores 143, 145.

The guide bores 143, 145 snugly but slidably receive the rods 121, 123 and take up all deflection in the rods during use. Thus, stress concentration which otherwise would exist at the outer ends 155, 157 of the threads 122, 124 on the rods 121, 123, respectively, as a result of rod deflection is prevented. This, in turn, greatly reduces the likelihood that the rods 121, 123 will fracture during use. Also, the cavities 147, 149 catch and trap chips, dirt and other foreign matter, which might get on the rods 121, 123 before assembly to the base 25 or get trapped in the guide bores 143, 145 so that this foreign matter cannot get into the threaded bores 135, 137 where it might cause damage. The cavities 147, 149 may be cleaned and foreign matter trapped therein removed upon removing the sub base 27 from the base 25. The rods 121, 123 have outer knurled ends 152, 154 to facilitate easy assembly and disassembly thereof to the base 25.

The thumb screws 131, 133 which hold the guide 119 to the rods 121, 123 are advantageous in that they afford rapid and easy guide adjustment. However, the threaded relation of the rods 121, 123 in the bores 135, 137 provides a more secure and firm connection between the guide 119 and the base 25 than was the case in prior constructions. The thumb screws 131, 133 engaging the rods 121, 123 prevent them from unthreading from the bores 135, 137 as does the parallel relation of the rods 121, 123 and the apertured bosses 127, 129. This is contrasted with the prior guide attachments referred to above wherein set screws or other clamping means of the friction type were used to hold both the rods on the base as well as the guide body on the rods. In these prior devices, once the friction grip afforded by the set screws on the clamp plate loosened, the rods were free to move and the accuracy of the guide was lost.

In use, the guide rods 121, 123 are threaded into the base bores 135, 137 either with the guide body 119 completely removed from the rods 121, 123 or with the thumb screws 131, 133 loosened. The guide body 119 is then positioned on the rods 121, 123 so that the guide plate 125 engages the edge 128 and properly locates the tool bit or implement (not shown). If desired, a micrometer adjustment block 158, slidable on the rod 121 and having a micrometer screw 160 carried thereby and threaded into the boss 127, may be provided for accurate and final adjustment of the guide body 119. The screw 160 has an enlarged knurled head 161 and a retainer ring 163 securing it against axial movement relative to the block 158.

To accurately position the guide body 119 on the rods 121, 123 then, the thumb screws 131, 133 are loosened as is a thumb screw 162 in the micrometer block 158. The guide body 119 is then moved to approximately the desired position relative to the base 25 by sliding on the rods 121, 123 and the thumb screw 162 is tightened on the rod 121. Thereafter, the micrometer screw 160 is turned to accurately position the guide body 119 and plate 125 after which the thumb screws 131, 133 are tightened. This secures the guide body 119 to the guide rods 121, 123 and prevents the latter from unthreading from the bores 135, 137. Also, if desired, the guide body 119 may have a concave edge 164 forming spaced corners 166, 168 at the side thereof remote from the guide plate 125 so that by reversing the guide body 119 on the rods 121, 123, these corners 166, 168 may engage with a curved or otherwise irregular work surface edge and guide the tool 11 therealong.

By the foregoing, there has been disclosed an improved router guide attaching construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a portable tool of the type having a housing, a drive motor supported by said housing and adapted to drive a tool implement, a base supporting said housing relative to a work surface and movable thereover; that improvement which comprises guide means engageable with an edge of said work surface to guide movement of said tool thereover, a pair of opening means formed in said base, each said opening means including an inner threaded portion and an outer guide portion separated by an enlarged cavity, a pair of elongated rods each having a reduced threaded end threaded into the threaded portion of a respective one of said opening means, a shoulder formed on each of said rods adjacent its reduced end and adapted to abut a shoulder in a respective one of said opening means adjacent said inner threaded portion, said rods being disposed generally parallel to one another and being snugly but slidably received by the guide portion of respective ones of said opening means, said guide means being slidably disposed on said rods, and releasable means carried by said guide means and engageable with each said rod to secure said guide thereto and prevent said rods from unthreading relative to said base.

2. A construction as defined in claim 1 wherein said releasable means includes thumb screws carried by said guide means and adapted to engage each said rod.

3. A construction as defined in claim 1 wherein said guide means includes a body having a plurality of apertured bosses slidably receiving said rods, and thumb screw means on said bosses engageable with said rods.

4. A construction as defined in claim 3 wherein one of said rods has micrometer adjustment means thereon and cooperable with said boss adjacent thereto.

5. A construction as defined in claim 1 wherein said guide means includes a body having straight edge means at one side concave edge means at the other side thereof, said body beign adapted to be reversably positioned on said rods, whereby in one position said straight edge means faces said tool implement and in the other position said concave edge faces said implement.

6. In a portable tool of the type having a housing, a drive motor supported by said housing and adapted to drive a tool implement, a base supporting said housing relative to a work surface and movable thereover; that improvement which comprises guide means engageable with an edge of said work surface to guide movement of said tool thereover, a pair of opening means formed in said base, each said opening means including an inner threaded portion and an outer guide portion separated by an enlarged cavity, said enlarged cavities extending to a bottom surface of said base and being covered by a sub base removably secured to said base, a pair of elongated rods each having a threaded end threaded into the threaded portion of a respective one of said opening means, said rods being disposed generally parallel to one another and being snugly but slidably received by the guide portion of respective ones of said opening means, said guide means being slidably disposed on said rods, and releasable means carried by said guide means and engageable with each said rod to secure said guide thereto and prevent said rods from unthreading relative to said base.

References Cited
UNITED STATES PATENTS

| 1,161,780 | 11/1915 | McClelland | 285—115 |
| 1,801,845 | 4/1931 | Burton | 285—15 X |
| 2,943,655 | 7/1960 | Pedersen et al. | 144—136 |

DONALD R. SCHRAN, Primary Examiner

U.S. Cl. X.R.

90—12; 144—134